Figure 1:
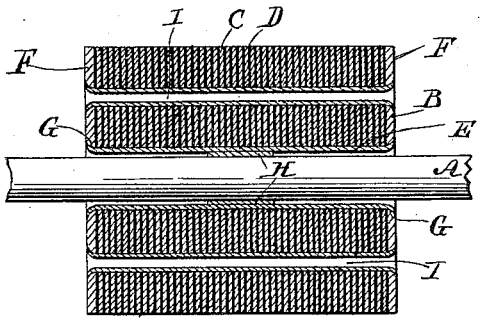

(No Model.)

C. A. LIEB.
ARMATURE BODY.

No. 441,246. Patented Nov. 25, 1890.

WITNESSES:

INVENTOR:
Charles A. Lieb
BY Phillips Abbott
his ATTORNEY

UNITED STATES PATENT OFFICE.

CHARLES A. LIEB, OF NEW YORK, N. Y.

ARMATURE-BODY.

SPECIFICATION forming part of Letters Patent No. 441,246, dated November 25, 1890.

Application filed September 18, 1890. Serial No. 365,561. (No model.)

*To all whom it may concern:*

Be it known that I, CHARLES A. LIEB, a citizen of the United States, and a resident of New York city, in the county of New York and State of New York, have invented certain new and useful Improvements in Armature-Bodies, of which the following is a specification.

My invention relates to improvements in armature bodies and shafts for dynamo-electric machines; and it consists in the construction, arrangement, and combination of the parts, as hereinafter set forth.

In the drawings the same reference-letters indicate the same parts in all the figures.

Figure 2:
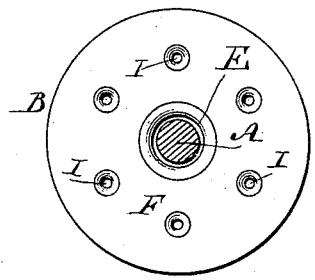
Figure 3:
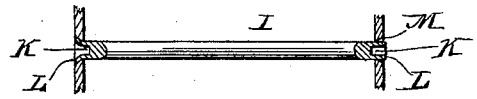

Figure 1 illustrates a longitudinal section of the armature-body, its shaft being shown in elevation. Fig. 2 illustrates an end elevation of the armature-body. Fig. 3 illustrates an elevation, partly in section, of an alternative construction of the stay-rods which are employed to bind the outer portions of the disks together.

A is the shaft.

B is the armature-body. It is composed of disks of metal C and insulating material D, all as usual.

E is a tube, preferably of brass, which is passed or forced through a hole made in all the disks.

The end plates F F of the armature-body are or may be reamed or countersunk, as at G, and the ends of the brass tube are expanded and forcibly turned back into the reamed-out or countersunk parts, while the disks are forcibly pressed together. Thus this central tube serves not only as a box or bushing for the armature-shaft, but it also firmly binds the disks together and does away with the shoulder and nut both on the shaft, now usually employed as a means of pressing and holding the disks together.

H is an inwardly-projecting annular ring, which is secured either to the central tube E or to the shaft; or, as I ordinarily prefer, it may be an integral part of the tube or of the shaft, thus avoiding joints. Its function is to prevent contact of the shaft with the tube, except at its central portion, so that any change of form which the armature-body may undergo will not be transmitted to the shaft, and in this way bending or twisting of the shaft is avoided. Of course the connection between the armature and the shaft through the part H is such that there will be no slipping.

I do not limit myself to the above-described means of connecting the armature and the shaft. It (the shaft) may take a bearing on the tube throughout, if preferred. Nor do I limit myself to brass as a metal frame from which the tube is to be made. It may be made of any other suitable material, being insulated, if desired.

I I, &c., are stay rods or bolts, which pass through the disks between the shaft and their periphery to bind the disks or plates more firmly together. These I use especially in large machines. They may be made of tubes, the same as the central tube E, but preferably smaller, or they may be solid rods. If of brass, they need not be insulated; but I prefer to make them of solid iron rods, as shown at I, Fig. 3. I bore out the ends of the rods, as shown at K K, leaving a relatively thin edge L, which can be readily expanded into the countersunk part M of the outer plates or disks in the same manner that the ends of the central tube or bushing is.

In Fig. 3 I show the solid rod I with one end expanded into the countersunk hole in the end plate of the armature-body and the other end left straight, as it appears before expanding.

It is not essential that the holes in the outside plates or disks should be countersunk. I prefer them to be, however. The metal of the tubes or rods may be expanded over onto the flat surface of the plates or disks; but this does not make so finished a job. I also sometimes expand the tubes after insertion in the holes through the disks throughout their entire length, thus by friction holding each individual metallic disk C in its proper place, thus preventing shifting or turning thereof. If this construction be employed, it will not always be necessary to expand the ends of the tubes.

I do not limit myself to the details of construction shown, since they may be somewhat departed from and still the essentials of my invention be employed.

I claim—

1. An armature-body comprising, essentially, a series of disks of iron and insulating material and a tube passing through the center thereof, the ends of which are turned over and expanded against the outermost plates or disks, substantially as set forth.

2. An armature-body comprising, essentially, a series of disks of iron and insulating material, a tube passing through the center thereof, the ends of which are turned over or expanded against the outermost plates or disks, and a ring or projection between and connecting the interior of the tube and the shaft, substantially as set forth.

3. An armature-body comprising, essentially, a series of disks of iron and insulating material, a tube passing through the center thereof, the ends of which are turned over or expanded against the outer plates or disks, and stay-rods between the central tube and the periphery of the disks, the ends whereof are also turned over or expanded against the outer plates or disks, substantially as set forth.

4. An armature-body having its several disks held together by means of a centrally-disposed hollow tube, the ends whereof are turned over or expanded against the outermost plates or disks, substantially as set forth.

5. An armature-body having its several plates or disks held together by stay-rods of solid metal, the ends whereof are turned over or expanded against the outermost plates or disks, and a central tube having a ring or projection between and connecting its interior and the shaft, substantially as set forth.

Signed at New York, in the county of New York and State of New York, this 12th day of September, A. D. 1890.

CHARLES A. LIEB.

Witnesses:
PHILLIPS ABBOTT,
FREDERICK SMITH.